US005381006A

United States Patent [19]

Wells et al.

[11] Patent Number: 5,381,006

[45] Date of Patent: Jan. 10, 1995

[54] METHODS OF USING ION TRAP MASS SPECTROMETERS

[75] Inventors: Gregory J. Wells, Fairfield; Minada Wang, Walnut Creek, both of Calif.

[73] Assignee: Varian Associates, Inc., Palo Alto, Calif.

[21] Appl. No.: 43,240

[22] Filed: Apr. 6, 1993

Related U.S. Application Data

[63] Continuation-in-part of Ser. No. 890,991, May 29, 1992, abandoned.

[51] Int. Cl.[6] .......... B01D 59/44; H01J 49/00

[52] U.S. Cl. .......... 250/282; 250/292

[58] Field of Search .......... 250/292, 291, 288, 282

[56] References Cited

U.S. PATENT DOCUMENTS

| | | | |
|---|---|---|---|
| 4,686,367 | 8/1987 | Louris et al. | 250/290 |
| 4,736,101 | 4/1988 | Syka et al. | 250/292 |
| 4,771,172 | 9/1988 | Weber-Grabau et al. | 250/282 |
| 5,196,699 | 3/1993 | Kelley | 250/292 |
| 5,198,655 | 3/1993 | Wells | 250/292 |
| 5,200,613 | 4/1993 | Kelley | 250/292 |
| 5,256,875 | 10/1993 | Hoekman et al. | 250/292 |
| 5,291,017 | 3/1994 | Wang | 250/292 |

FOREIGN PATENT DOCUMENTS

| | | | |
|---|---|---|---|
| 336990 | 10/1989 | European Pat. Off. | H01J 49/52 |
| 362432 | 4/1990 | European Pat. Off. | H01J 49/42 |
| 93/05533 | 3/1993 | WIPO | H01J 49/42 |

*Primary Examiner*—Bruce C. Anderson

*Attorney, Agent, or Firm*—Edward H. Berkowitz; Gerald Fisher

[57] ABSTRACT

Improved methods of using an ion trap mass spectrometer, whereby AC voltages supplemental to the AC trapping voltage are used for scanning the trap, for conducting chemical ionization experiments, and for conducting $MS^n$ experiments, are shown. In one embodiment a broadband supplemental AC voltage is applied to rid the trap of ions above or below a preselected cutoff mass. This is particularly useful in conducting chemical ionization experiments for eliminating high mass sample ions that are formed when the reagent gas is ionized by electron impact ionization. Likewise, this technique may be used to eliminate low mass reagent ions when conducting an electron impact ionization experiment in the presence of a reagent gas. In another embodiment a non-resonant, low-frequency supplemental voltage is applied to the trap causing trapped ions to undergo collision induced dissociation. Multiple generations of ion fragments may be simultaneously formed in this manner, thereby enabling $MS^n$ experiments. The low-frequency supplemental field has the additional property of causing high mass ions to be ejected from the trap as a function of the magnitude of the supplemental voltage. This property may be used to scan the trap, for example, by scanning the magnitude of the supplemental voltage. Likewise, when conducting chemical ionization experiments, this property may be used for eliminating unwanted high mass sample ions, formed during ionization of the reagent gas, from the trap.

47 Claims, 11 Drawing Sheets

METHODS OF USING ION TRAP MASS SPECTROMETERS

This application is a continuation in part of Ser. No. 890,991, filed May 29, 1992, now abandoned.

FIELD OF THE INVENTION

The present invention relates to methods of using ion trap mass spectrometers ("ion traps") by applying supplemental voltages to the trap, and is particularly related to methods of operating ion traps in the chemical ionization mode, and for conducting multiple mass spectroscopy experiments ("$MS^n$").

BACKGROUND OF THE INVENTION

The quadrupole ion trap, sometimes referred to as an ion store or an ion trap detector, is a well-known device for performing mass spectroscopy. A ion trap comprises a ring electrode and two coaxial end cap electrodes defining an inner trapping volume. Each of the electrodes preferably has a hyperbolic surface, so that when appropriate AC and DC voltages (conventionally designated "V" and "U", respectively) are placed on the electrodes, a quadrupole trapping field is created. This may be simply done by applying a fixed frequency (conventionally designated "f") AC voltage between the ring electrode and the end caps. The use of an additional DC voltage is optional.

Typically, an ion trap is operated by introducing sample molecules into the ion trap where they are ionized. Depending on the operative trapping parameters, ions may be stably contained within the trap for relatively long periods of time. Under certain trapping conditions, a large range of masses may be simultaneously held within the trap. Various means are known for detecting ions that have been so trapped. One known method is to scan one or more of the trapping parameters so that ions become sequentially unstable and leave the trap where they may be detected using an electron multiplier or equivalent detector. Another method is to use a resonance ejection technique whereby ions of consecutive masses can be sequentially scanned out of the trap and detected.

The mathematics of the trapping field, although complex, are well developed. Ion trap users are generally familiar with the stability envelop diagram depicted in FIG. 1. For a trap of a given radius $r_0$ and for given values of U, V and f, whether an ion of mass-to-charge ratio (m/e) will be trapped depends on the solution to the following two equations:

$$a_z = \frac{-8eU}{mr_0^2\omega^2}$$

$$q_z = \frac{4eV}{mr_0^2\omega^2}$$

Where $\omega$ is equal to $2\pi f$.

Solving these equations yields values of a and q for a given m/e. If, for a given ion, the point (a,q) is inside the stability envelop of FIG. 1, the ion will be trapped by the quadrupole field. If the point (a,q) falls outside the stability envelop, the ion will not be trapped and any such ions that are created within the trap will quickly depart. It follows that by changing the values of U, V or f one can control whether a particular mass ion is trapped in the quadrupole field. It should be noted that it is common in the field to use the terms mass and mass-to-charge ratio interchangeably. However, strictly speaking, it proper to use the term mass-to-charge ratio.

In the absence of a DC voltage, the equations set forth actually relate to stability in the direction of the z axis, i.e., the direction of the axis of the electrodes. Ions will become unstable in this direction before becoming unstable in the r direction, i.e., a direction radial to the axis. Thus, it is normal to limit consideration of stability to z direction instability. The differential in stability results in the fact that unstable ions will leave the trap in the z direction, i.e., axially.

In commercially available implementations of the ion trap, the DC voltage, U, is set at 0. As can be seen from the first of the above equations, when U=0, then $a_z=0$ for all mass values. As can be seen from the second of the above equations the value of $q_z$ will be inversely proportional to the mass of the particle, i.e., the larger the value of the mass the lower the value of $q_z$. Likewise, the higher the value of V the higher the value of $q_z$. Turning to the FIG. 1 stability envelop, it can also be seen that for the case where U=0, and for a given value of V, all masses above a certain cut-off value will be trapped in the quadrupole field. Although all masses above a cut-off value are stable in such a trapping field, there are limits to the quantity of ions of a particular mass value that will be trapped due to space charge effects. As discussed below such quantity limitations are also a function of the magnitude of V.

Several methods are known for ionizing sample molecules within the ion trap. Perhaps the most common method is to expose the sample to an electron beam. The impact of electrons with the sample molecules cause them to become ionized. This method is commonly referred to as electron impact ionization or "EI".

Another commonly used method of ionizing sample with an ion trap is chemical ionization or "CI". Chemical ionization involves the use of a reagent gas which is ionized, usually by EI within the trap, and allowed to react with sample molecules to form sample ions. Commonly used reagent gases include methane, isobutane, and ammonia. Chemical ionization is considered to be a "softer" ionization technique. With many samples CI produces fewer ion fragments than the EI technique, thereby simplifying mass analysis. Chemical ionization is a well known technique that is routinely used not only with quadrupole ion traps, but also with most other conventional types of mass spectrometers such as quadrupole mass filters, etc.

Other, more specialized, methods of ionization are also in use in mass spectroscopy. For example, photoionization is a well known technique that, similar to electron impact ionization, will affect all molecules contained in the trap.

Most ion trap mass spectrometer systems in use today include a gas chromatograph ("GC") as a sample separation and introduction device. When using a GC for this purpose, sample which elutes from the GC continuously flows into the mass spectrometer, which is set up to perform periodic mass analyses. Such analyses may, typically, be performed at a frequency of about one scan per second. This frequency is acceptable since peaks typically elute from a modern high resolution GC over a period of several seconds to many tens of seconds. When performing CI experiments in such a system, a continuous flow of reagent gas is maintained. As a practical matter it is undesirable to interrupt the flow of sample gas from the GC to the ion trap. Likewise, when conducting both CI and EI experiments on a sample stream, it is undesirable to interrupt the flow of reagent gas to the ion trap.

When performing CI, it is necessary to ionize a reagent gas, which then chemically reacts with and ionizes the sample gas. As noted, electron impact ionization within the ion trap is the preferred method of ionizing the reagent gas. However, if sample is present in the ion trap when the electron beam is turned on to ionize the reagent gas, the sample will also be subject to EI. As noted above, where chromatography is used to separate a sample before it is introduced into the ion trap, it is impractical to interrupt the flow of sample gas. Therefore, there is not a practical way to ionize the reagent gas without also ionizing the sample. Thus, unless mitigating measures are taken, sample ions will be formed by both CI and EI, leading to potentially confused results.

The prior art solution to this problem is described in U.S. Pat. No. 4,686,367, entitled *Method of Operating Quadrupole Ion Trap Chemical Ionization Mass Spectrometer,* issued on Aug. 11, 1987, to Louris, et al. The method of the '367 patent seeks to minimize the effects of EI of the sample by minimizing the number of sample ions trapped by the ion trap while reagent gas is being ionized. The method that is taught for doing this is to apply a low value of V to the trap during the EI step so that the low mass reagent ions will be trapped, but the number of high mass ions will be small. In the words of the patent, "at sufficiently low RF values, [i.e., values of V] high molecular weight ions are not efficiently trapped. So, at low RF voltages only the low mass ions are stored." (Column 5, lines 33–36.)

As is explained above, when operating using the RF only method, which is preferred in the '367 patent and which is the method used in all known commercial embodiments of the ion trap, the trap inherently traps all masses above a cut-off mass which is set by the value of the RF trapping voltage. Thus, to trap low mass ions, whether they be reagent ions or sample ions, it is necessary to set V at a sufficiently low value. When V is set low enough the trap inherently has a poor efficiency in trapping high mass ions due to space charge effects. A theoretical way of looking at this is that the volume of the interior of the ion trap which stores ions of a particular mass is proportional to the value of V and is inversely proportionally to the mass. Thus, for any given V a smaller volume of the ion trap is available to store high mass ions than low mass ones. When the volume is quite small the number of ions that can be stored is reduced due to space charge effects.

It should be noted that setting a low value of V does not cause all high mass ions to leave the trap; such ions continue to have values of a and q that map into the stability envelop. All that can be done following the technique of the '367 patent is to reduce the number of high mass ions in the trap during the EI step. In this respect, the statement in the patent that "at low RF voltages only the low mass ions are stored" appears to be incorrect. As described below, experimental results show the presence of detectable quantities of high mass ions created by EI in experiments conducted using the method of the '367 patent. Moreover, the number of high mass ions that remain trapped will depend on the mass, so that a substantial number of sample ions close, yet higher, in mass than the reagent ions, will be trapped.

Some reagent molecules form a variety of ions having different masses. Ionization at RF voltages substantially below that necessary to trap the lowest mass reagent ion, which is necessary to remove most of the high mass sample ions, will reduce the number of reagent ions that are trapped, as well as the high mass sample ions. This effect is related to mass so that the higher mass reagent ions will be disproportionately lost from the trap.

A related problem exists when conducting both EI and CI experiments on a single sample stream in an ion trap. As noted above, for practical reasons it is undesirable to stop the flow of reagent gas to the trap. However, if reagent gas is present when an EI experiment is run, the reagent gas will be ionized creating reagent gas ions which may cause CI of the sample unless they are eliminated from the trap before reactions can occur. This problem does not exist when conducting only EI experiments on a sample stream since the reagent gas flow may simply be kept off during such experiments.

The method of the lowering the trapping voltage is not applicable, however, to solving this problem since it would not eliminate low mass reagent ions from the trap. One solution used to solve this problem, as taught in the '367 patent, is to raise the RF trapping voltage so as not to store the low mass reagent ions. However, this has the undesired effect of changing the trapping conditions from those which are normally used. For example, when the trapping voltage is set to store ions of mass 20 and above, the average ionizing energy of electrons entering the trap is 70 eV. Raising the trapping voltage to store only ions of mass 45 and above, so as to eliminate methane reagent ions at mass 43, would double the average electron energy. Such an increase would change the mass spectrum of many compounds and would reduce the trapping efficiency for the sample ions.

In a CI process it is desirable to optimize the number of product ions that undergo mass analysis. If there are too few product ions, the mass analysis will be noisy, and if there are too many product ions resolution and linearity will be lost. The formation of product ions is a function of the number of reagent ions present in the trap, the number of sample molecules in the trap, the reaction rate between the reagent ions and the sample ions, and the reaction time during which reagent ions are allowed to react with sample molecules. One can increase the number of reagent ions present in the trap by increasing the EI ionization time, i.e., keeping the electron beam on a longer time. Likewise, one can increase the number of sample ions formed in the trap by increasing the reaction time.

One prior art method of addressing this issue is set forth in U.S. Pat. No. 4,771,172, entitled *Method Of Increasing The Dynamic Range And Sensitivity Of A Quadrupole Ion Trap Mass Spectrometer Operating In The Chemical Ionization Mode,* issued on Sep. 13, 1988, to Weber-Grabau, et al. This patent covers a method of adjusting the parameters used in an ion trap in the CI mode so as to optimize the results. In order to optimize the parameters, the patent teaches the method of performing a CI "prescan," done in accordance with the method of the '367 patent, preceding each mass analysis. This prescan is a complete CI scan cycle in which the ionization and reaction times are fixed at values smaller than those that would be used in a normal analytical scan, and in which the product ions are scanned out of the trap faster than in a normal analytical scan. The resulting product ions that are ejected from the trap during the prescan are not mass resolved and the ion signal is only integrated to give a total product ion signal. During the prescan the total number of product ions in the trap are measured and the parameters, i.e., the ionization time and/or the reaction time for the subsequent mass analysis scan are adjusted.

Thus, the patent covers a two-step process consisting of first conducting a "prescan" of the contents of the ion trap to obtain a gross determination of the number of product ions in the trap, followed by a mass analysis scan of the type taught in the '367 patent, with the parameters of mass analysis scan being adjusted based on the data collected during the prescan. The disadvantage of the prior art method of extending the dynamic range by using a prescan to estimate the sample amounts in the trap is that it requires additional time to perform the prescan, and thus fewer analytical scans can be performed in the same time period. Not only does each of the prescans consume time, but each produces data which has no independent value apart from its use in adjusting the parameters for the mass analysis scan. However, adjustments in the mass analysis scan parameters are only required when conditions change. It is not necessary to make adjustments for each scan and, thus, in many instances the prescan step, in addition to consuming time, will not serve any useful purpose. Thus, there is a need for an improved method of adjusting the ion trap during chemical ionization experiments to operate within its dynamic range.

There is a demand to employ the ion trap mass spectrometer in conducting so-called $MS^n$ experiments. In $MS^n$ experiments, a single ion species is isolated in the trap and is dissociated into fragments. The fragments created directly from the sample species are known in the art as daughter ions, and the sample is referred to as the parent ion. The daughter ions may also be fragmented to create granddaughter ions, etc. The value of n refers to the number of ion generations that are formed; thus, in an $MS^2$ or MS/MS experiment, only daughter ions are formed and analyzed.

A prior art method of conducting $MS^n$ experiments is described in U.S. Pat. No. 4,736,101, entitled *Method Of Operating Ion Trap In MS/MS Mode,* issued Apr. 5, 1988 to Syka, et al. After isolating an ion species of interest, the parent ions are resonantly excited by means of a single supplemental AC frequency which is tuned to the resonant frequency of the ions of interest. The amplitude of the supplemental frequency is set at a level which causes the ions to gain energy so that their oscillations within the trap are greater, but which is not large enough to cause the ions to be ejected from the trap. As the ions oscillate within the trap they collide with molecules of the damping gas in the trap and undergo collision induced dissociation thereby forming daughter ions. By applying resonant frequencies associated with the mass-to-charge ratios of the daughter ions, they can similarly be fragmented.

The difficulty with the method of the '101 patent is that the precise resonant frequency of the ions of interest cannot be determined a priori but must be determined a posteriori. The resonant frequency of an ion, also referred to as its secular frequency, varies with the ion mass-to-charge ratio, the number of ions in the trap, hardware variances and other parameters which cannot be precisely determined in a simple way. Thus, the precise resonant frequency of an ion species must be determined empirically. While empirical determination can be performed without great difficulty when a static sample is introduced into the trap, it is quite difficult to accomplish when a dynamic sample, such as the output of a GC, is used.

One prior art approach to overcoming the foregoing problem in determining the precise resonant frequency of a sample ion of interest is to use a broadband excitation centered around the calculated frequency. For example, such a broadband excitation may have a bandwidth of about 10 KHz. Another method is to conduct a frequency prescan, i.e., sweep the supplemental field across a frequency range in the area of interest and observe the resonant frequency empirically. However, neither of these solutions are particularly satisfactory.

Accordingly, it is an object of the present invention to provide an new method of eliminating sample ions created in an ion trap during ionization of a reagent gas, which is both simple and which has greater efficiency than methods known in the prior art, and without the need to change the RF trapping field between the ionization and reaction steps.

Another object of the present invention is to provide a method for conducting electron impact ionization experiments in an ion trap in the presence of a reagent gas, whereby reagent ions formed in the trap are eliminated from the trap before they are able to react with sample molecules.

Yet another object of the present invention relates to a method of optimizing the experimental parameters utilized in an ion trap in order to operate within dynamic range of the trap.

Still another object of the present invention is to provide a simple, yet highly effective, method for conducting $MS^n$ experiments in an ion trap that does not require the empirical determination of the resonant frequency of the sample species isolated in the trap.

Yet another object of the present invention is to provide an alternate method of scanning a trap to obtain a mass spectrum of its contents.

SUMMARY OF THE INVENTION

These, and other objects of the invention that will be apparent to those skilled in the art after reading the specification hereof along with the appended claims and drawings, are realized by a novel method of applying supplemental fields to an ion trap mass spectrometer. In one embodiment, the invention comprises adjusting the trapping field parameters of an ion trap mass spectrometer so that ions having mass-to-charge ratios within a desired range will be stably trapped, introducing sample and reagent gas into the trap, ionizing the contents of the trap, and eliminating sample ions from the trap by applying a supplemental AC voltage to the trap which cause the sample ions, but not the reagent ions, to be ejected from the trap. The supplemental AC voltage may either be a broadband voltage having frequency components corresponding to the resonant frequencies of the higher mass sample ions, or a low-frequency voltage having a magnitude selected to cause only masses above a selected cut-off mass to be ejected from the trap.

In another embodiment of the present invention, a supplemental AC field is used to eliminate reagent ions, but not sample ions, formed in the ion trap during electron ionization of the contents of the trap, by resonant ejection so that EI experiments may be conducted in the presence of a reagent gas flow, without the need to readjust the trapping field.

In another embodiment of the present invention, mass spectral data associated with the largest peak measured during one scan of the ion trap is used to adjust, if necessary, experimental parameters utilized during the subsequent scan so that the trap is operated within its dynamic range.

In other embodiments, a low frequency supplemental dipole voltage is applied to the trap and is used to cause fragmentation of the ions within the trap, and may be used to scan the contents of the trap.

FIG. *3a–b* is a graph showing the control of the supplemental broadband AC field in relation to the gating of the electron beam used for electron impact ionization in accordance with the present invention.

FIGS. 4A–4G are mass spectra of various samples comparing the present invention with the method of the prior art.

Figure 2:
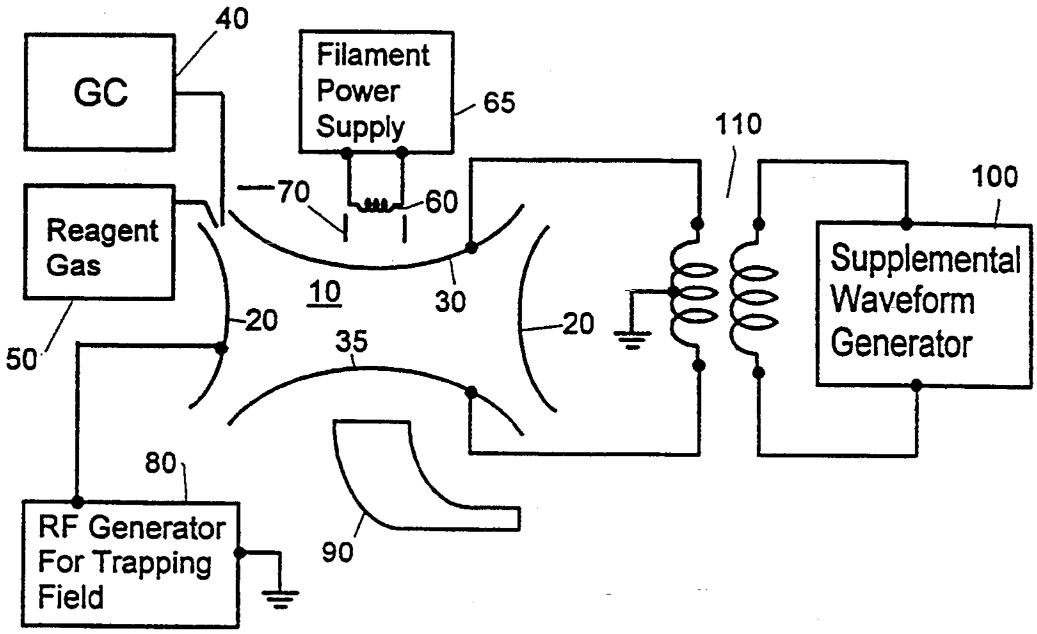
FIG. 2 is a partially schematic view of apparatus used to practice the method of the present inventions.
Figure 5:
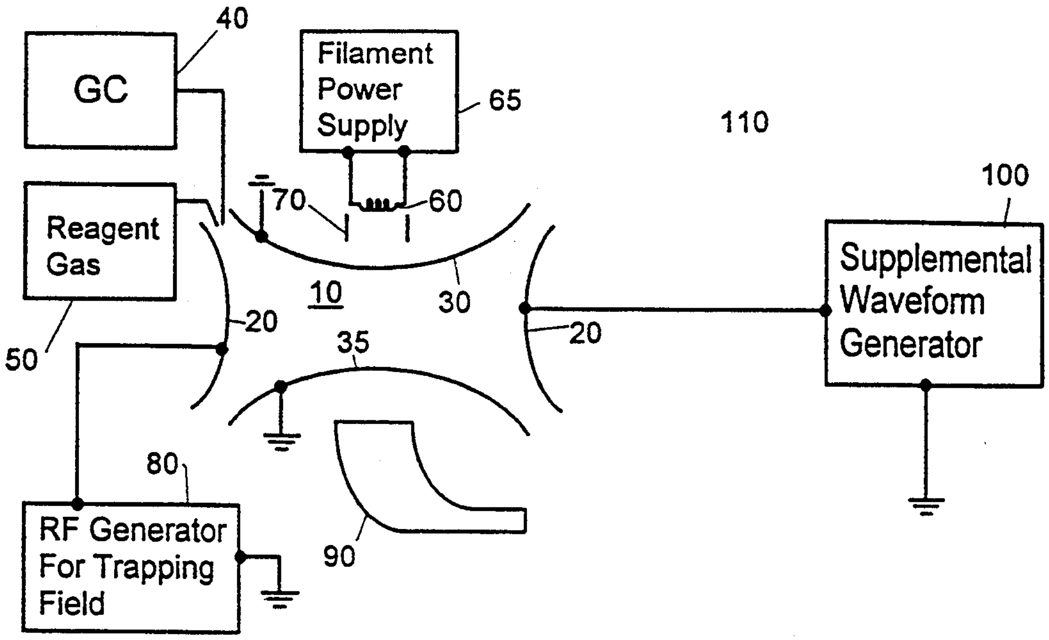

FIG. 5 shows an alternate arrangement of the apparatus of FIG. 2 for use in practicing the present invention.

FIGS. 6A–6E are mass spectra of various samples showing how the application of a supplemental low frequency field may be used to cause fragmentation of a parent ion within an ion trap.

Figure 7A:
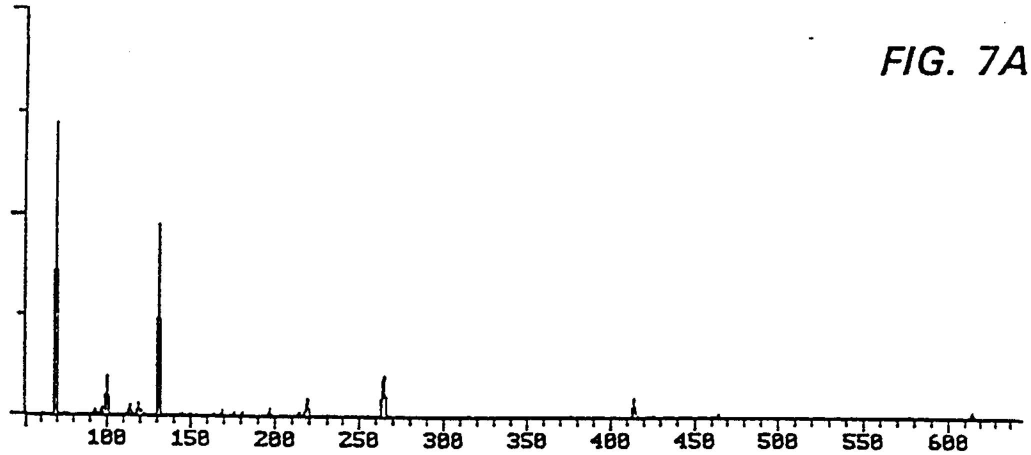
Figure 7B:
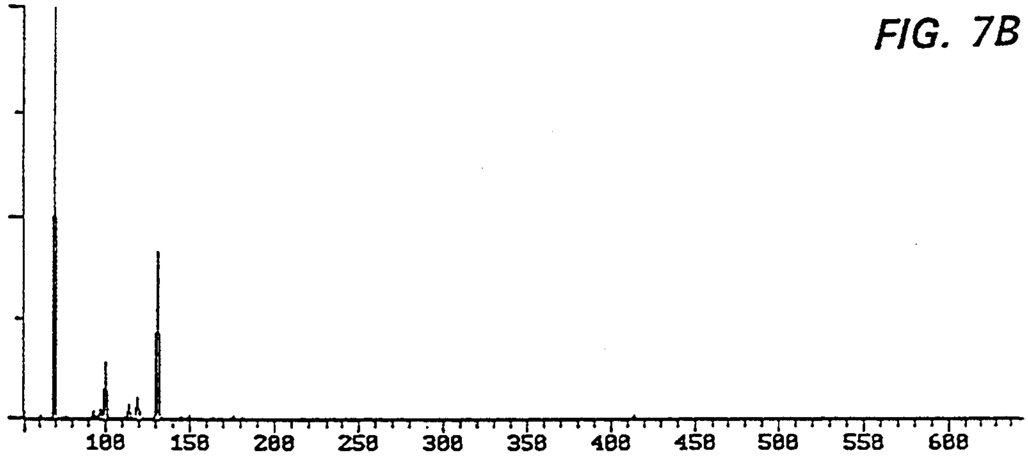
Figure 7C:
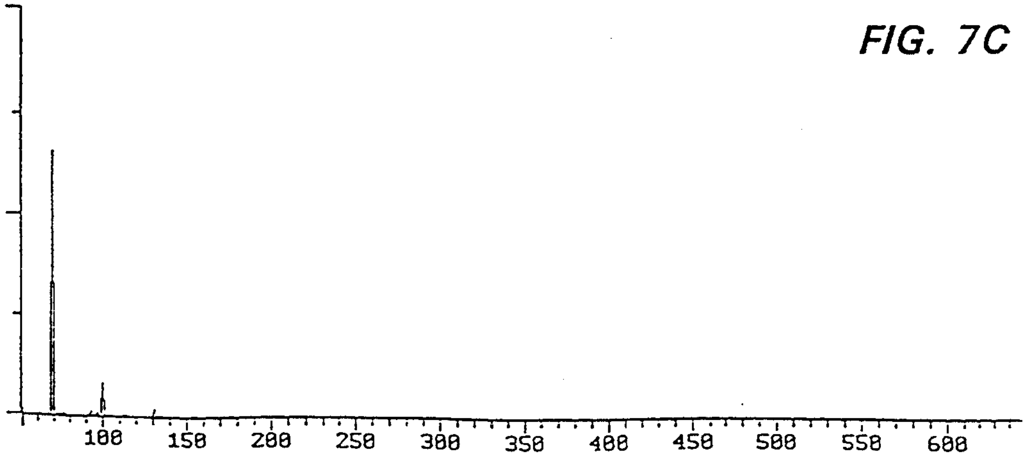

FIGS. 7A–7C are mass spectra showing how the application of a supplemental low frequency field may be used to eliminate high mass ions from an ion trap.

Figure 8C:
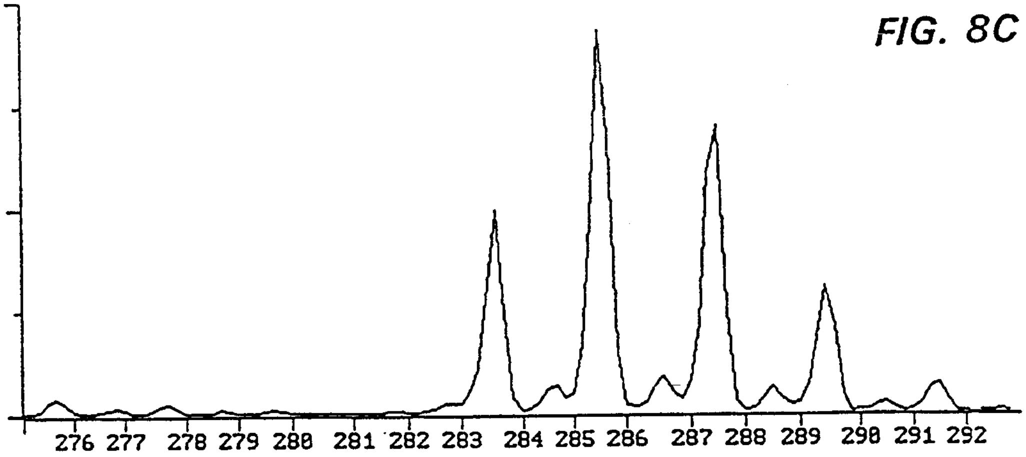
Figure 8A:
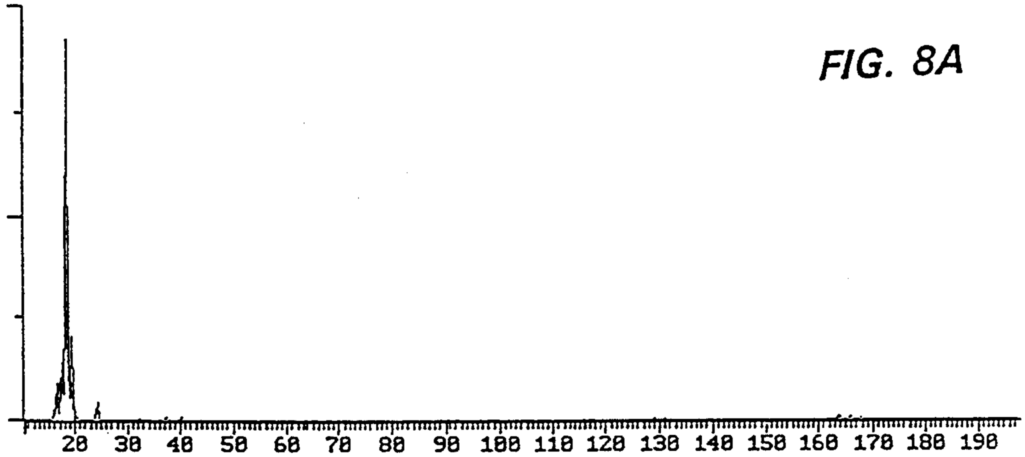
Figure 8B:
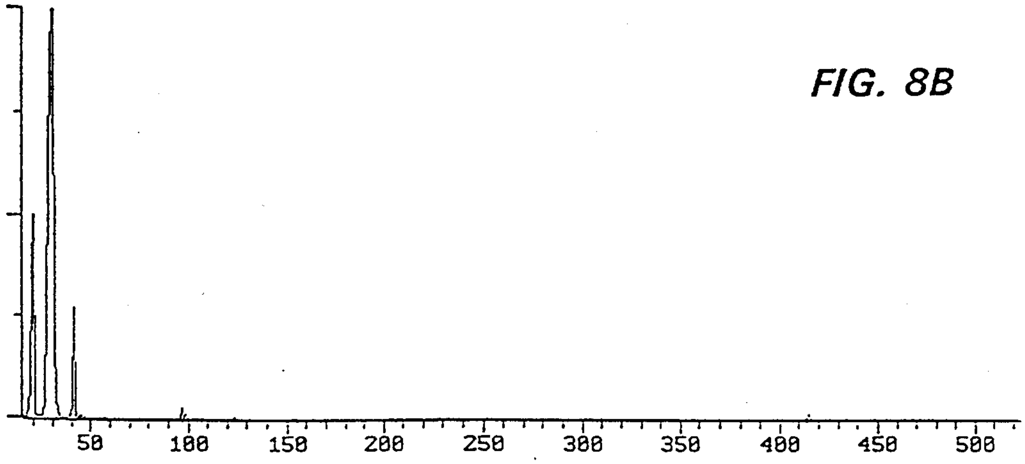

FIGS. 8A–8C are mass spectra showing how the application of a supplemental low frequency field may be used in conducting chemical ionization experiments.

Figure 9:
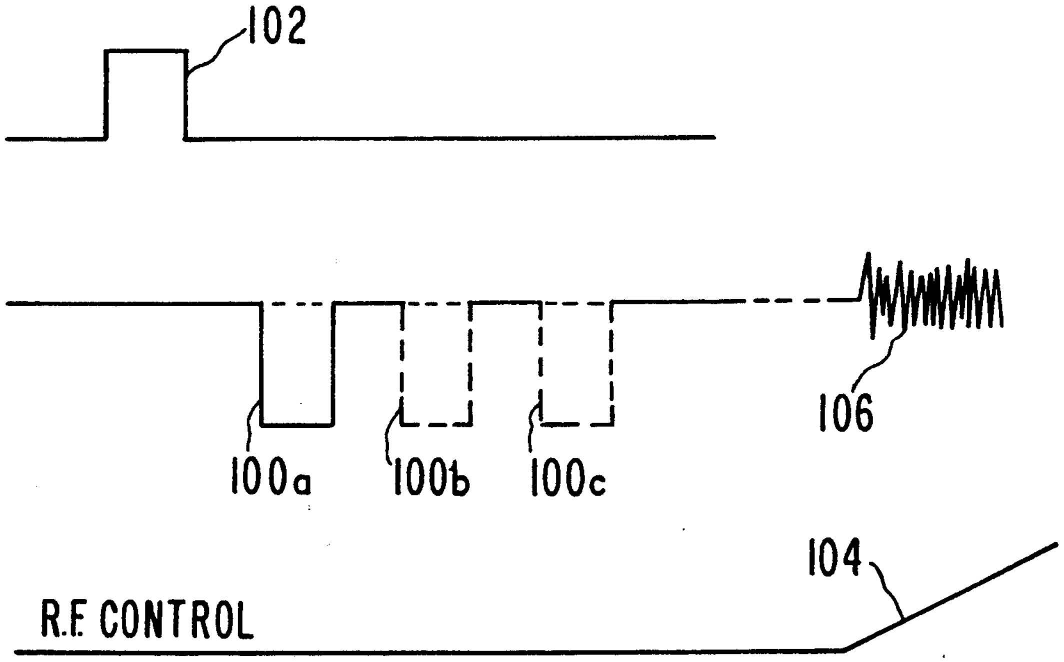

FIG. 9 shows a relationship of a unipolar pulse to the gating of the electron beam and the scan of the content of the ion trap.

Figure 10A:
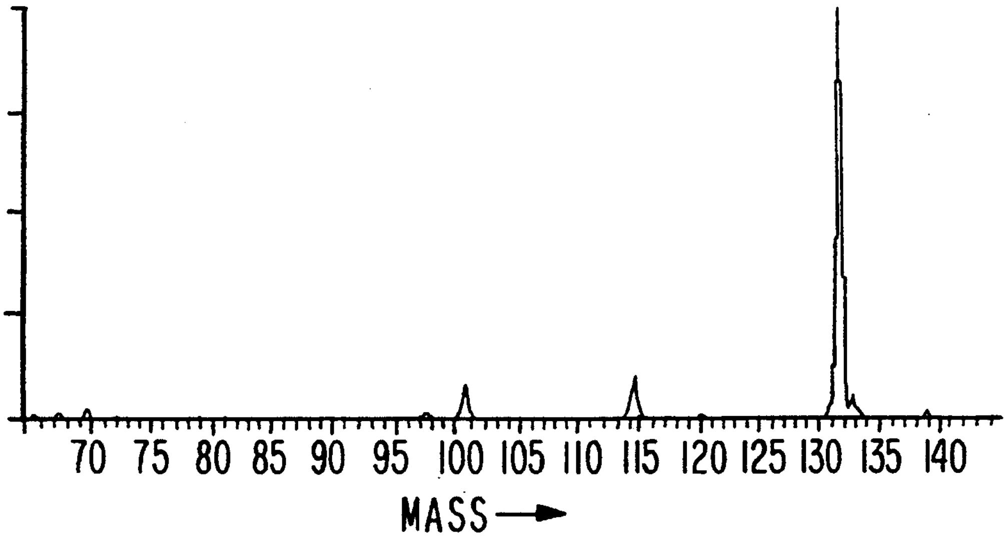

FIG. 10*a* shows a conventional spectrum of a low mass region of PFTBA.

Figure 10B:
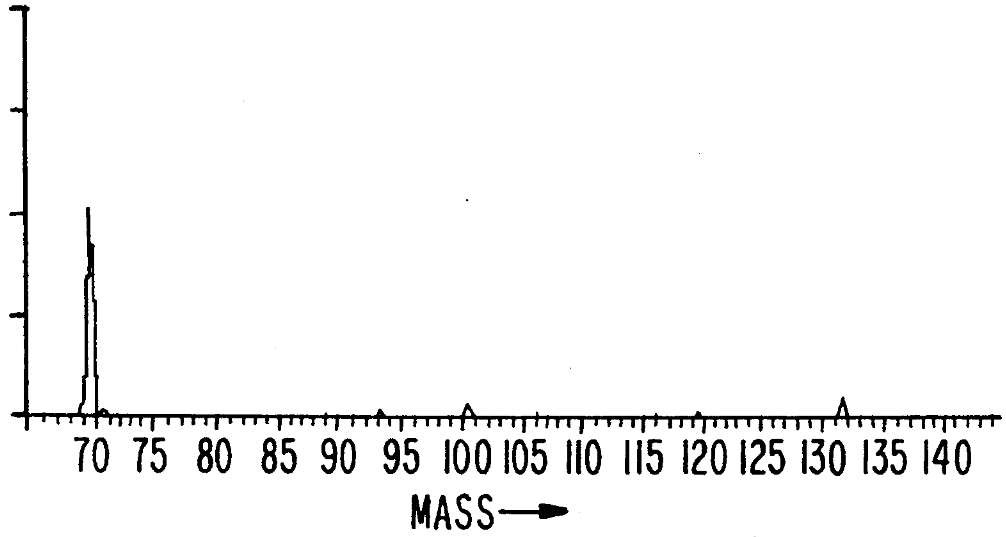

FIG. 10*b* is the same as FIG. 10*a* with a single unipolar pulse with 10 ms width, forty volts amplitude applied across the end caps.

Figure 10C:
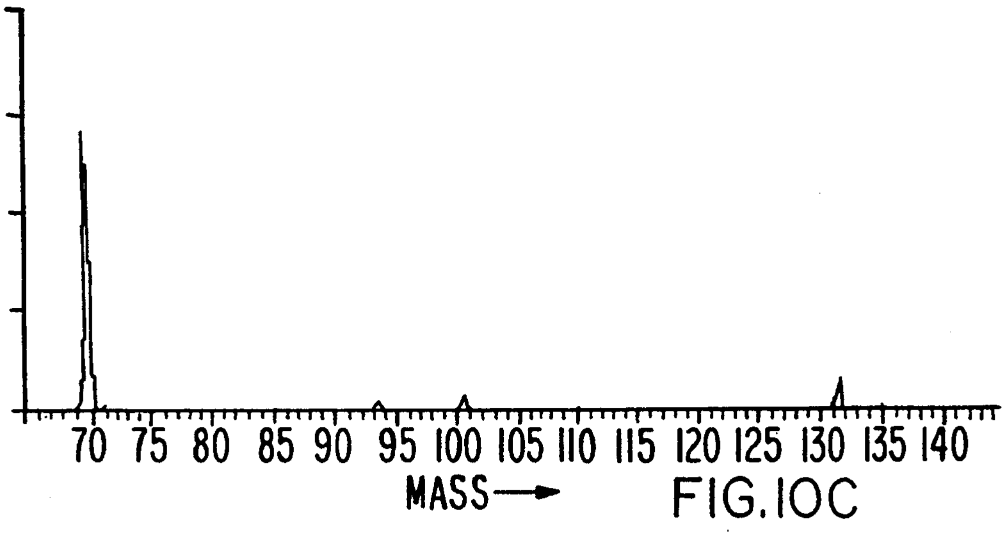

FIG. 10*c* is the same as FIG. 10*b* with three unipolar pulses applied.

DETAILED DESCRIPTION

An apparatus for practicing the present invention is schematically shown in FIG. 2. Ion trap 10, shown schematically in cross-section, comprises a ring electrode 20 coaxially aligned with upper and lower end cap electrodes 30 and 35, respectively. Preferably, the trap electrodes have hyperbolic inner surfaces, although other shapes, for example, electrodes having a cross-sections forming an arc of a circle, may also be used to create trapping fields. The design and construction of ion trap mass spectrometers is well-known to those skilled in the art and need not be described in detail. A commercial model ion trap of the type described herein is sold by the assignee hereof under the model designation Saturn.

Sample gas, for example from a gas chromatograph 40, is introduced into the ion trap 10. Since GC's typically operate at atmospheric pressure while ion traps operate at greatly reduced pressures, pressure reducing means (not shown) are required. Such pressure reducing means are conventional and well known to those skilled in the art. While the present invention is described using a GC as a sample source, the source of the sample is not considered a part of the invention and there is no intent to limit the invention to use with gas chromatographs. Other sample sources, such as, for example, liquid chromatographs with specialized interfaces, may also be used.

Also connected to the ion trap is a source of reagent gas 50 for conducting chemical ionization experiments. Sample and reagent gas that is introduced into the interior of ion trap 10 may be ionized by electron bombardment as follows. A beam of electrons, such as from a thermionic filament 60 powered by filament power supply 65, is controlled by a gate electrode 70. The center of upper end cap electrode 30 is perforated (not shown) to allow the electron beam generated by filament 60 and gate electrode 70 to enter the interior of the trap. The electron beam collides with sample and reagent molecules within the trap thereby ionizing them. Electron impact ionization of sample and reagent gases is also a well-known process that need not be described in greater detail.

Figure 1:
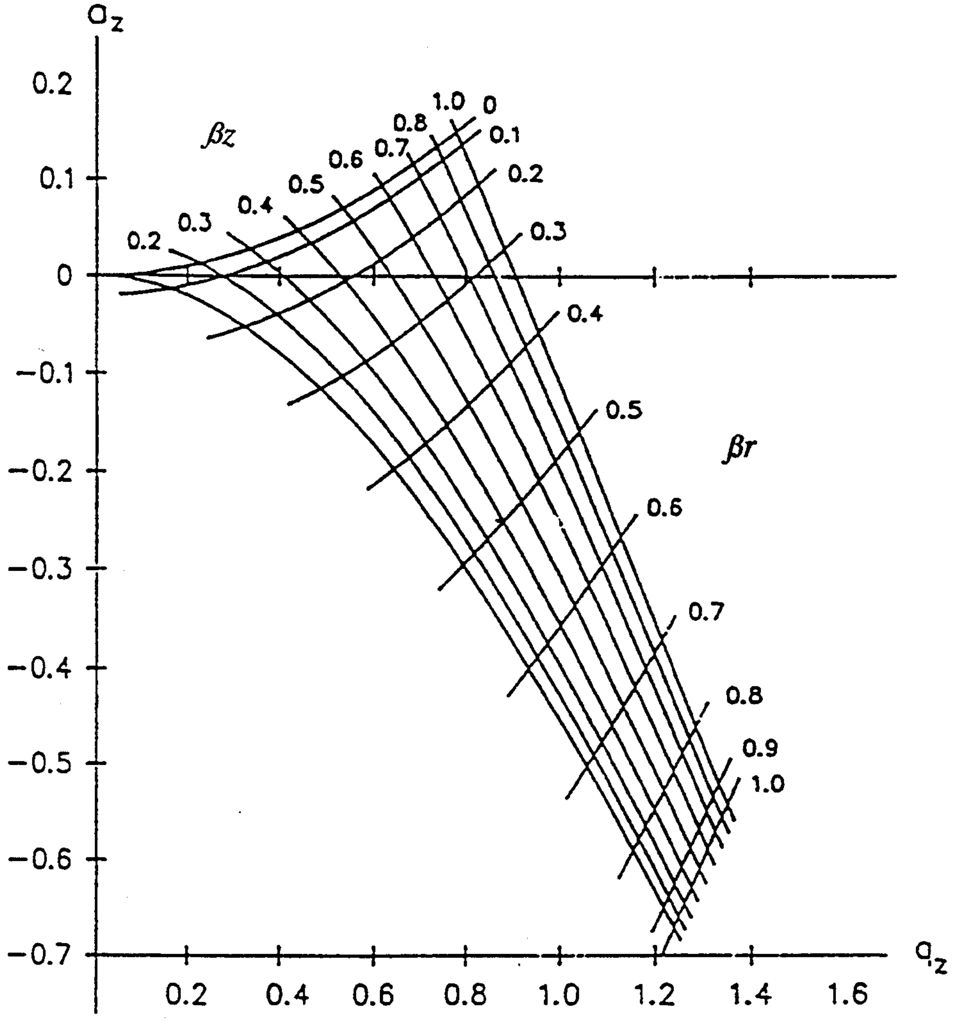
FIG. 1 is a plot of the stability diagram associated with an ion trap.

A trapping field is created by the application of an AC voltage having a desired frequency and amplitude to stably trap ions within a desired range of mass-to-charge ratios. RF generator 80 is used to create this field, and is applied to the ring electrode. While it is well known that one may also apply a DC voltage to modify the trapping field and to work at a different portion of the stability diagram of FIG. 1, as a practical matter, commercially available ion traps all operate using an AC trapping field only.

A variety of methods are known for determining the mass-to-charge ratios of the ions which are trapped in the ion trap to thereby obtain a mass spectrum of the sample. One known method is to scan the trap so that ions of sequential mass-to-charge ratio are ejected in order. A first known method of scanning the trap is to scan one of the trapping parameters, such as the magnitude of the AC voltage, so that ions sequentially become unstable and leave the trap where they are detected using, for example, electron multiplier means 90.

Another known method of scanning the trap involves use of a supplemental AC dipole voltage applied across end caps 30 and 35 of ion trap 10. Such a voltage may be created by a supplemental waveform generator 100, coupled to the end caps electrodes by transformer 110. The supplemental AC field is used to resonantly eject ions in the trap. Each ion in the trap has a resonant frequency which is a function of its mass-to-charge ratio and of the trapping field parameters. When an ion is excited by a supplemental RF field at its resonant frequency it gains energy from the field and, if sufficient energy is coupled to the ion, its oscillations exceed the bounds of the trap, i.e., it is ejected from the trap. Ions ejected in this manner can also be detected by electron multiplier 90 or an equivalent detector. When using the resonant ejection scanning technique, the contents of the trap can be scanned in sequential order by either scanning the frequency of the supplemental RF field or by scanning one of the trapping parameters such as the magnitude of V, the AC trapping voltage. As a practical matter, scanning the magnitude of the AC voltage is preferred.

In addition, a new method of scanning the ion trap is described hereinbelow.

Figure 3:
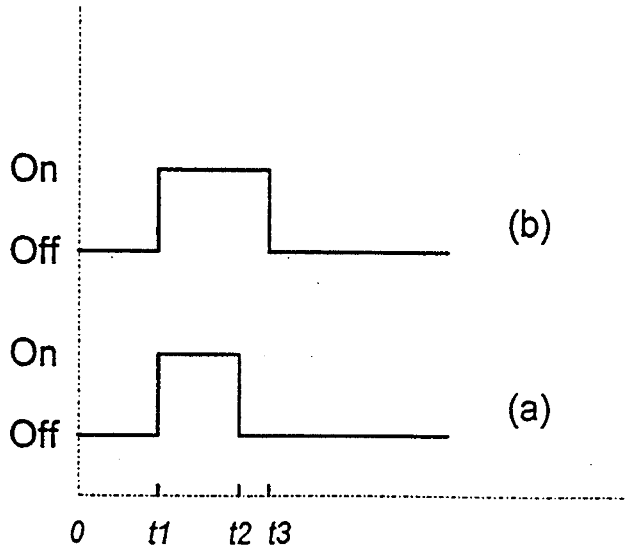

In one embodiment of the present invention, supplemental RF generator 100, which may also be used for scanning the trap as described above, is capable of generating a broadband RF field which is used to resonantly eject sample ions created by EI during the time that the reagent gas is being ionized. FIG. 3(*a*) shows the gating of the electron beam used to ionize the reagent gas. Beginning at t1 and ending at t2, electron gate 70 is turned on to allow the electron beam to enter the trap to form reagent ions from the neutral reagent gas. As shown in FIG. 3(*b*) coincident with the electron gate admitting electrons into the trap, supplemental waveform generator 100 applies a broadband signal to the end caps of the trap, 30, 35, for a period of time that begins at t1 and ends at t3. As shown, the broadband excitation exceeds the gate time. Alternately, the supplemental broadband signal could be applied starting at a time later than t1, or even later than t2, i.e., after the electron ionization is complete. Likewise, the supplemental signal could also start at a time prior to t1, the important aspect being that the supplemental field for elimination of unwanted sample ions be kept "on" for a period of time extending after the end of the period during which ions are created.

The broadband AC voltage applied to the end caps can either be out of phase (dipole excitation) or in phase (quadrupole excitation). An alternative method of obtaining quadrupole excitation is the application of the supplemental waveform to the ring electrode as shown in FIG. 5, rather than to the end caps.

The supplemental waveform contains a range of frequencies of sufficient amplitude to eject unwanted sample ions of mass greater than the highest mass reagent ion, by means of resonant power absorption by the trapped ions. Each of the sample ions is in resonance with a frequency component of the supplementary waveform. Accordingly, they absorb power from the supplementary field and leave the trapping field. After the supplemental field has ejected the unwanted ions it is turned off and the CI reagent ions react with the sample molecules to produce CI sample ions. These ions are then scanned from the trap for detection in a conventional manner as described above.

The supplemental waveform described above is broadband and has a first frequency component corresponding to the lowest mass to be ejected and a last frequency corresponding to the highest mass to be ejected. Between the first and last frequencies are a series of discrete frequency components which may be spaced evenly or unevenly, and which may have phases that are either random or with a fixed functional relationship. The amplitudes of the frequency components can either be uniform or they can be tailored to a functional form so as to compensate for frequency dependencies of the hardware or to compensate for the distribution of q values due to the distribution of the masses that are stored in the trap. The broadband waveform has a sufficient number of frequency components so that any ion with a resonant frequency between the first and last components of the waveform will be resonantly ejected by this supplemental field. Thus, all sample ions formed during EI will be eliminated from the trap before the mass analysis scan and there will be no gaps in the mass range that is affected.

As a practical matter, the reagent gases that are used in CI experiments are all low in molecular weight such that the reagent ions formed during EI of the contents of the trap will, in almost all cases, be lower in mass-to-charge ratio than the sample ions. In the rare instance when a sample ion is created that is lower in mass than the reagent ions, a specific frequency may be added to the broadband excitation to cause that specific mass to be ejected along with others.

The advantage of the invention over prior art is the ability to remove unwanted sample ions formed by EI during the ionization of the CI reagent gas. The ability to reject these ions will allow longer ionization times and greater emission currents to be used, thus increasing the sensitivity of CI.

Figure 4A:
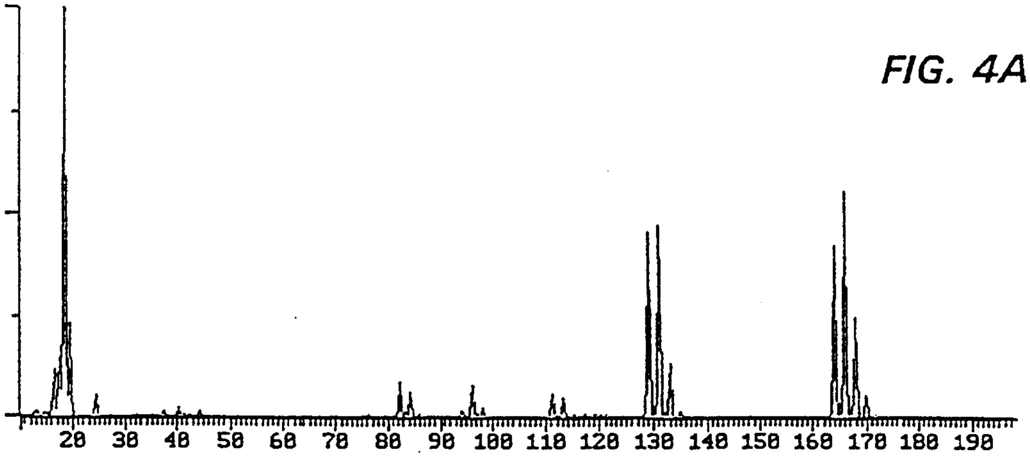
Figure 4B:
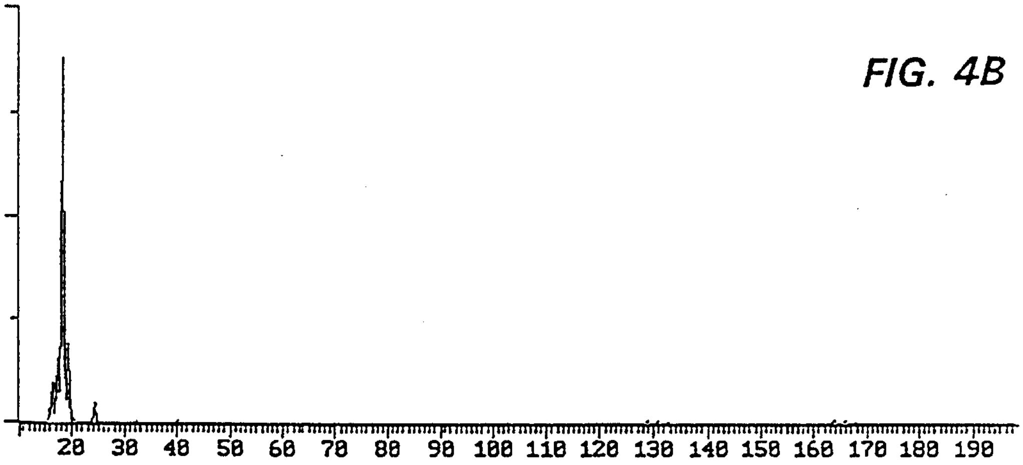
Figure 4C:
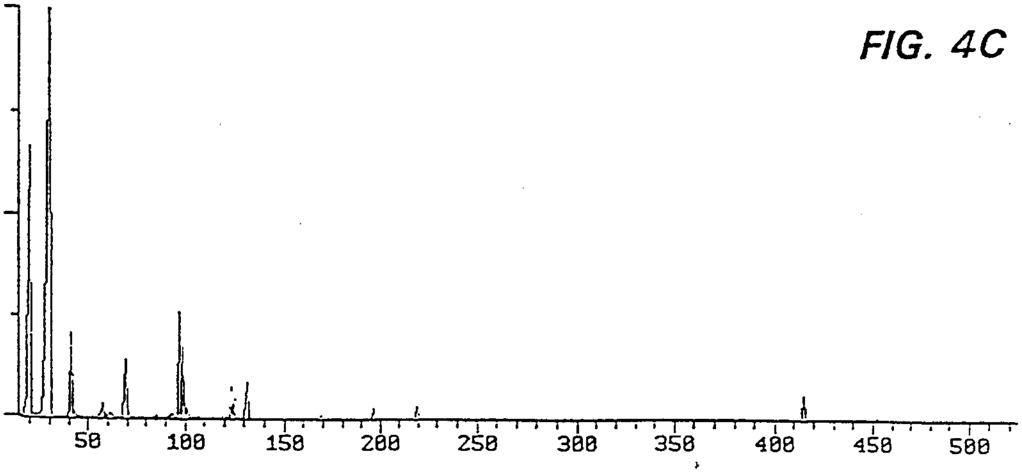
Figure 4D:
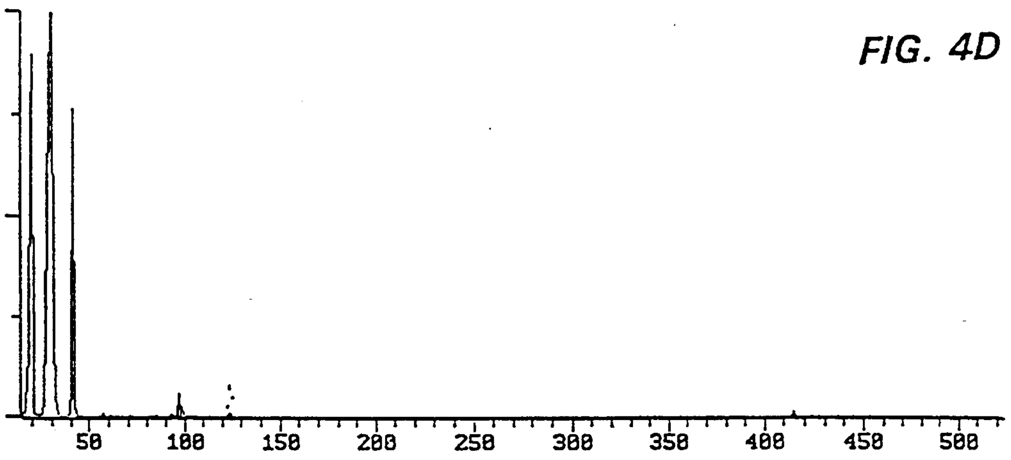
Figure 4E:
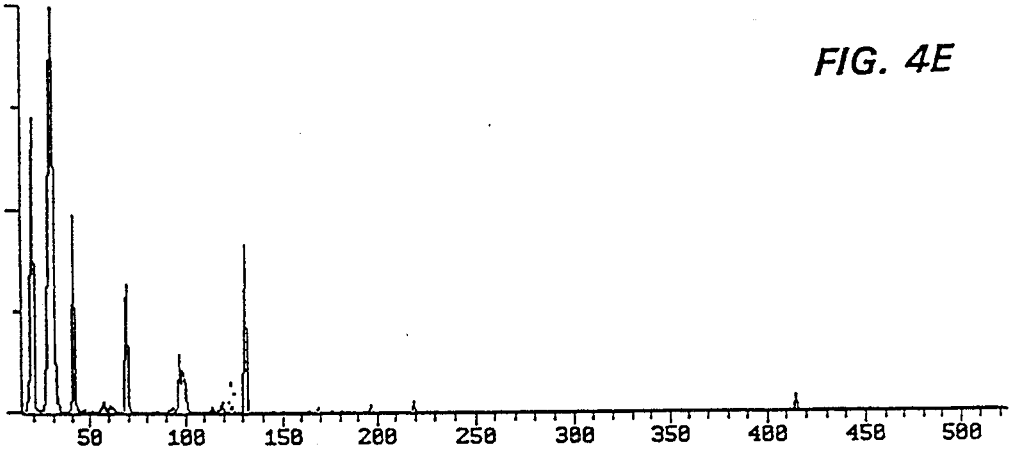
Figure 4F:
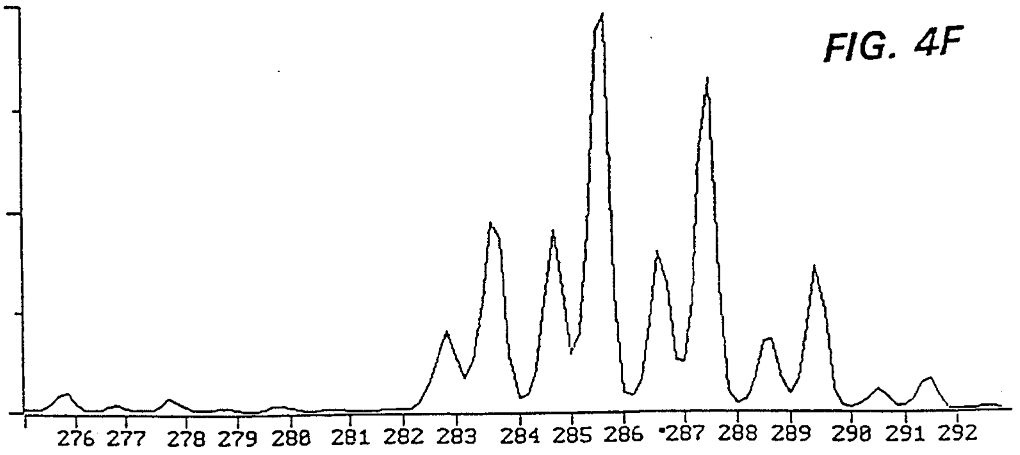
Figure 4G:
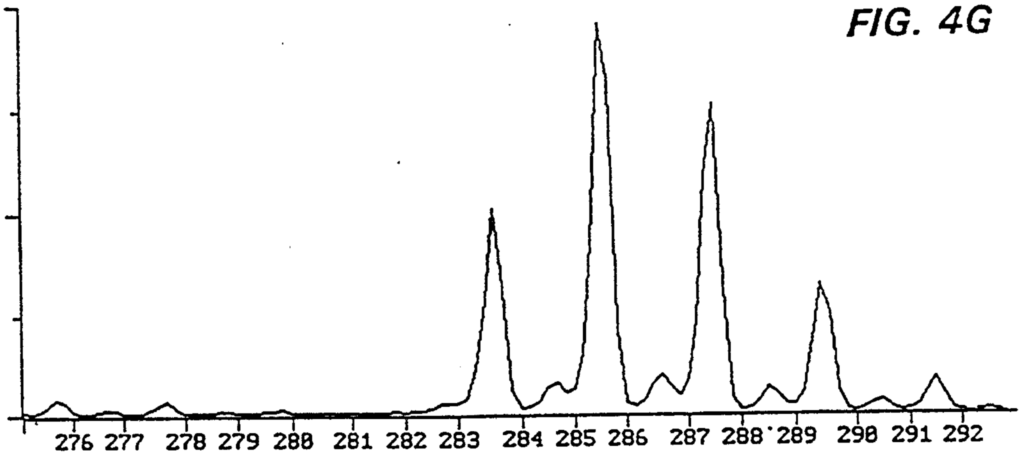

FIG. 4A shows the residual EI spectrum of a sample of tetrachloroethane using the scan conditions that are used in the prior art method. FIG. 4B shows the elimination of the sample ions formed during the ionization step using the broadband waveform. FIG. 4C shows the residual EI spectrum of a sample of trichloroethane and PFTBA with methane reagent gas present in the trap using the prior art method. FIG. 4D shows the elimination of the sample ions formed during the ionization step using the broadband waveform of the present invention. It can be seen that the reagent ions at mass 43 are still present even though the sample ions that are just above them in mass are removed. FIG. 4E shows the spectrum under the same conditions as in FIG. 4D except that the supplemental waveform is off. FIG. 4F shows a-spectrum of hexachlorobenzene using the prior art method. A mixture of EI ion fragments are observed at mass 282, 284, 286, 288 and 290. In addition, ions due to the protonated sample (from CI) are observed at mass 283, 285, 287, 289 and 291. FIG. 4G shows the spectrum using the method described herein. It can be seen that the unwanted ions from the EI process are almost completely removed.

In another aspect of the present invention, data obtained from one scan are used, if necessary, to adjust the parameters of the subsequent scan to ensure that the trap is operated within its dynamic range. Preferably, the amplitude of the most intense ion of a scan (the base peak) is used to adjust the ionization and/or reaction time for the next scan. The magnitude of the base peak is used to adjust the ionization and reaction times for the subsequent scan so as to maintain a substantially constant number of ions of the base peak. Since most of the charge ejected from the trap during the scan is due to the base peak, it is a good representation of the total amount of charge from the sample in the trap. By keeping the total sample charge nearly constant in the trap the dynamic range of the sample can be increased. Alternately, with the mass spectral information from one scan it is possible to adjust the parameters of the subsequent mass analysis scan to focus, for example, on only particular sample ions of interest, i.e., to optimize for a particular species.

Preferably, when adjusting the parameters for a scan based on the previous scan, both the reaction time and the ionization time are changed in a set ratio. This makes it easier to normalize the results from one scan to the next.

An advantage of this inventive method is the reduction in the scan time for large dynamic range samples. This is accomplished by using the intensity of the base peak from the previous scan as a measure of the amount of sample in the trap; thus eliminating the need for a time-consuming prescan as is used in the prior art.

A broadband supplemental field can also be used to eliminate reagent ions from the trap when conducting an EI experiment. In some instances, the user of an ion trap may wish to conduct both EI and CI experiments on the same sample stream. Under such circumstances, it is undesirable to stop the flow of reagent gas into the trap while conducting EI, yet the presence of reagent ions is likely to cause confused analytic data. By using a supplemental RF broadband excitation, any reagent ions formed during electron impact ionization of the sample can be resonantly ejected from the trap as soon as they are created. The same timing sequence shown in FIG. 3 can be used to practice this aspect of the invention. In this embodiment of the invention, the broadband RF excitation may be constructed in accordance with any of the above-described alternatives, except that the frequency range should be tailored to eliminate only the low mass reagent ions.

Waveform generator 100 of FIG. 2 can also be used to apply a low frequency non-resonant field to perform CI experiments, to conduct $MS^n$, experiments and to scan the contents of the trap to obtain a mass spectrum. A low frequency supplemental voltage from waveform generator 100 is applied as a dipole field across end caps 30, 35 of ion trap 10. The frequency of the dipole field is unrelated to the resonant frequencies of any of the ions (whether sample or reagent ions) stored in the trap. The waveform shape is preferably a square wave, but may be almost any shape including sine, sawtooth, triangular waveforms. As noted, the frequency of the supplemental voltage is relatively low, such as between 100 Hz and several thousand Hz. Experiments suggest that the present invention would work at frequencies below about 10,000 Hz, which is about the beginning of the range of resonant frequencies of sample ions. Preferably, however, the frequency should be in the range of hundreds of Hz.

It has been found that a single lobe of the selected periodic waveform such as a unipolar square wave pulse, is effective for the purposes described. A series of such unipolar pulses may be applied periodically, or aperiodically for a complex series of collisional disassociation.

It is believed that the supplemental squarewave dipole field alternately displaces the center of the pseudopotential well of the trapping field to different locations along the z-axis. Each time the center of the pseudopotential well of the trapping field is displaced, trapped ions pick up translational energy from the trapping field and begin to oscillate around the new center. Thus, displacement of the center of the oscillations tends to increase the magnitude of the oscillations. Gradually, as the ions lose energy to the background gas, they move towards the new center. If the center of the pseudopotential field is again moved, such as when the squarewave changes polarity, the process repeats itself. It can be seen that the frequency of the supplemental dipole field should be low so that ions are able to migrate towards the new center before the field is changed.

When the center of the pseudo-potential well is moved, as described above, the ions begin oscillating about a new point in space becoming more energetic. The energy added to ions will be sufficient to cause many of them to dissociate due to collisions with the damping gas, thereby forming daughter ions. As the process is repeated, more and more of the ions will dissociate in this manner. Another advantage of this method is that it imparts more energy to the ions than resonance excitation and, thus, in some cases, can result in more extensive ion fragmentation.

Since the method described above does not rely on the resonant frequency of the ions in the ion trap, it operates on all ions in the trap simultaneously. Thus, using this method it is possible to simultaneously create several generations of ion fragments without the need to apply resonant frequencies associated with each of the fragments. If desired, prior to practicing the present invention, an ion species of interest could first be isolated in the trap in accordance with known prior art methods.

Using this method it is possible to obtain a complete "fingerprint" of a compound, facilitating the identification of the compound.-Mass-to-charge ratio cannot, alone, be used to unambiguously identify a parent ion. However, knowing not only the mass-to-charge ratio of the parent ion, but also the masses of all of the ion fragments can be used to unambiguously identify the parent.

It has also been discovered that applying a low frequency voltage to the ion trap can be used as a mechanism to cause ions having masses above a certain cutoff mass to be eliminated from the ion trap. The cutoff mass is a function of the magnitude of the supplemental low-frequency voltage. One model of how an ion trap operates is that the ions are, in essence, trapped in a potential well, with the "depth" of the well being a function of, among other things, the mass-to-charge ratio. The higher the mass, the shallower the well. It is believed that the observed phenomenon of elimination of high mass ions by application of a low frequency supplemental field is related to the relatively shallow depth of the potential well associated with high mass ions. In particular, it is believed that the shifting of the center of the pseudo-potential well causes high mass ions to gain sufficient energy to overcome the well barrier and leave the ion trap.

This phenomenon can be used to advantage both in chemical ionization experiments and in scanning the ion trap. As described above, when conducting chemical ionization experiments, it is necessary to eliminate high mass sample ions that are created during EI of the reagent gas. An alternate method of eliminating the sample ions is to apply a low-frequency supplemental field, as described above, having a magnitude which is sufficient to eliminate all sample ions from the trap, while leaving the reagent ions unaffected. The timing sequence for applying this supplemental low-frequency field may be as depicted in FIG. 3, or any of the alternatives timing sequences described above in connection therewith. In this regard, it is noted that the ionization period of FIG. 3(*a*) which may be less than a millisecond in duration, may be shorter in duration than a half-cycle of the low-frequency supplemental voltage. Thus, the duration of application of the supplemental voltage, as shown in FIG. 3(*b*), may be much longer in duration, and FIG. 3 is not drawn to scale.

The application of a low-frequency supplemental voltage can also be used as a mechanism for scanning the ion trap to obtain a mass spectrum. This can be done by scanning the magnitude of the supplemental low-frequency voltage. If the supplemental voltage is initially low and is ramped-up, masses will be ejected from the trap sequentially in descending order. Alternately, the low-frequency supplemental voltage can be held constant and one of the trapping parameters scanned to obtain the equivalent effect.

Figure 6A:
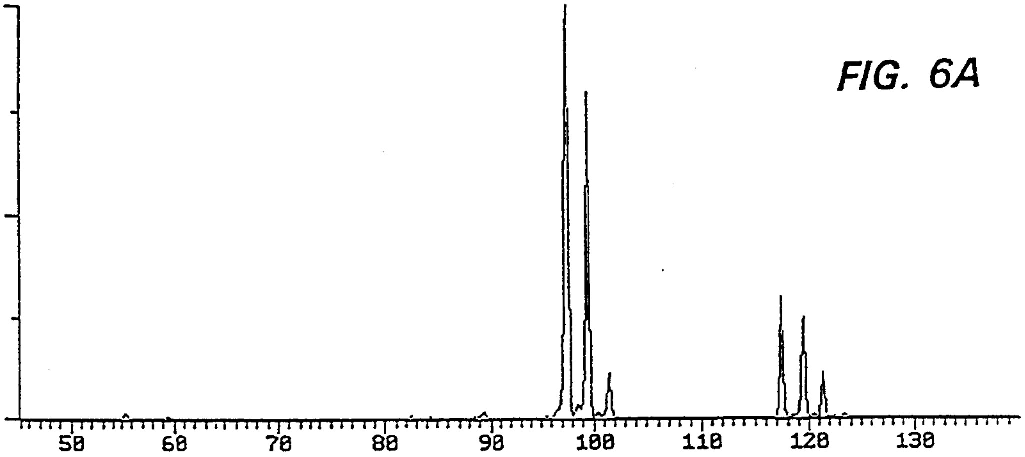
Figure 6B:
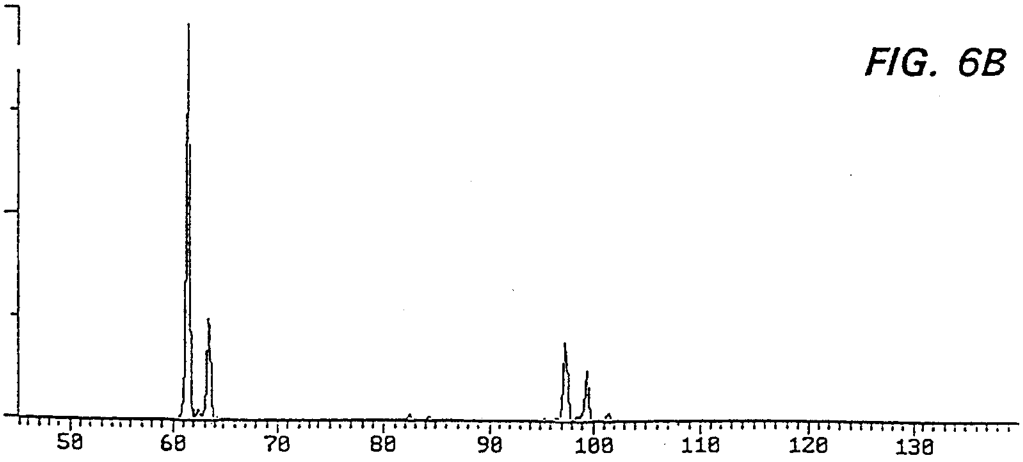

FIG. 6A is a mass spectrum of 1,1,1-trichloroethane obtained in a conventional manner. The peak at mass 97 corresponds to $CH_3CCl_2^+$. In comparison, FIG. 6B is a mass spectrum of 1,1,1-trichloroethane obtained using the same experimental parameters as FIG. 6A, except that a low-frequency supplemental squarewave voltage (100 Hz, 42 volts) was applied for 20 milliseconds. It can be seen from FIG. 6B that the peak intensity at mass 97 has been reduced, and that ions of mass 61 ($CH_2CCl^+$) are abundant. As a result of non-resonant excitation, the mass 97 ions absorbed energy and some were dissociated to form the mass 61 ions.

Figure 6C:
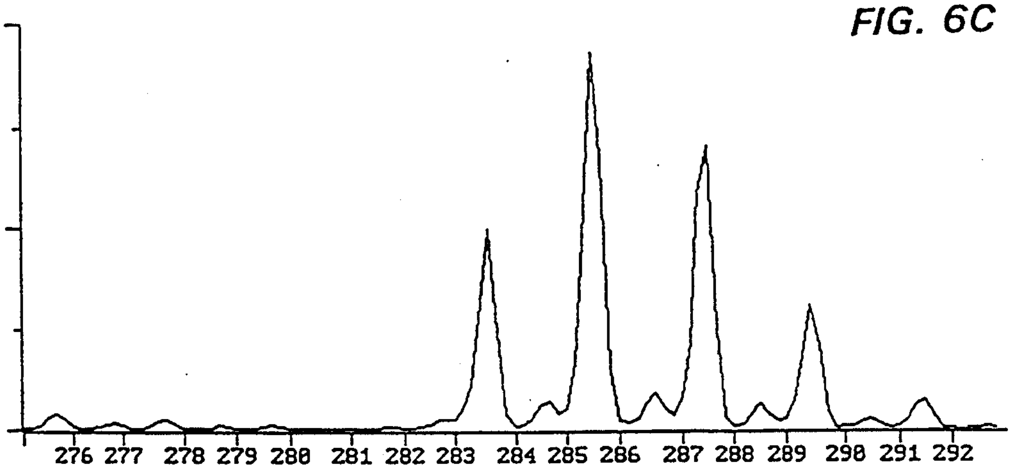
Figure 6D:
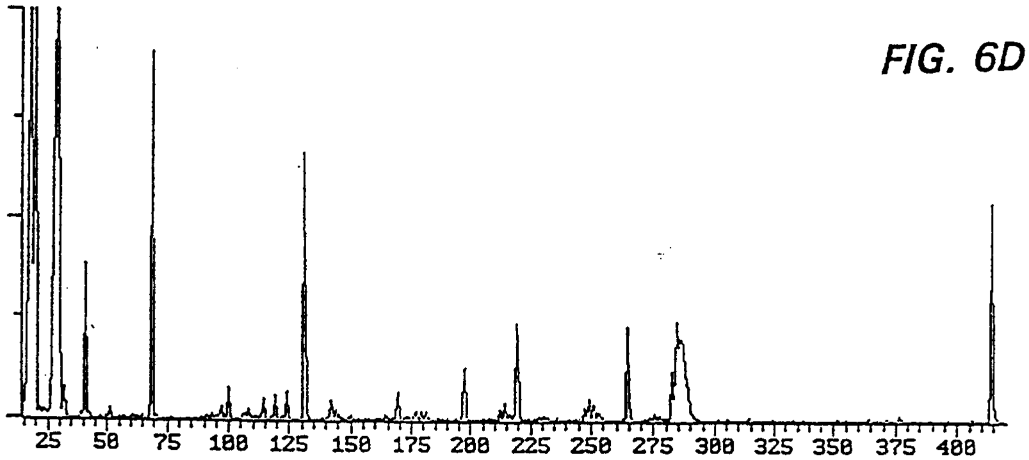
Figure 6E:
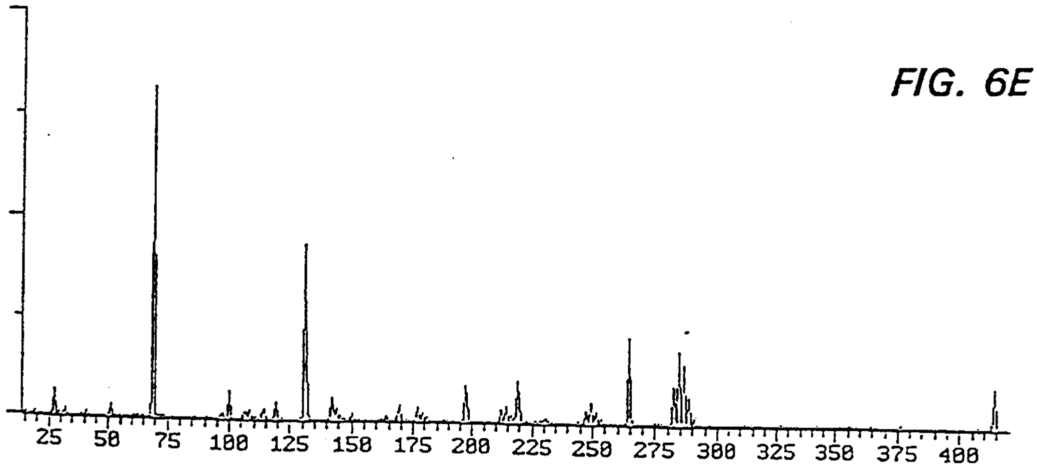

FIGS. 6C and 6D show spectra of 1,1,1-trichloroethane obtained using the same parameters used to obtain the results of FIGS. 6A and 6B, except that the frequency of the supplemental squarewave was set at 300 and 600 Hz, respectively. The similarity of the spectra of FIGS. 6B, 6C and 6D show that the dissociation is largely independent of the frequency of the supplemental field over a broad range. Finally, FIG. 6E shows a mass spectrum of 1,1,1-trichloroethane obtained using the method of the prior art, i.e., rather than use a non-resonant low-frequency squarewave, a resonant sine wave of 139.6 KHz (the z-axis resonant frequency of ion mass 97) was applied for 20 ms at a level of 800 mv. It can be seen that the daughter ion yields of both methods were about the same.

FIGS. 7A–C show mass spectra of PFTBA under various conditions to demonstrate how the method of the present invention may be used to eliminate high mass ions from the ion trap. FIG. 7A shows a complete mass spectra including both the parent and fragment ions. FIG. 7B shows that all ions with mass above 131 were eliminated from the trap when the voltage of the supplemental squarewave was raised to 20 v. FIG. 7C shows that raising the voltage to 33 v causes all ions with mass greater than 100 to be eliminated from the trap.

The application of a transient supplemental field across the end caps of the ion trap is effective to produce collisional disassociation. This may conveniently be realized in a single unipolar pulse. FIG. 9 demonstrates the application of such a pulse commencing at a time $\tau$ after the termination of the ionization gating pulse 102. After a selected period of time the trap is scanned by application of the RF ramp 104, optimally accompanied by another waveform 106 applied across the end caps.

If desired, further such unipolar pulses such as pulse 100A and 100B can be applied.

FIG. 10*a* shows a spectrum of the parent ion of n-butal benzene of nominal mass 134. At FIG. 10*b* a single unipolar pulse of 10 ms. width and amplitude 40 volts is applied about 2.5 ms. after termination of the electron beam gate. It is apparent that the mass 134 peak has been reduced and the mass 69 peak quite noticeably augmented.

At FIG. 10*c*, three identical unipolar pulses are applied at 10 ms. intervals. Little additional effect is obtained in this case in comparison with the single pulse. However, it is apparent that the use of multiple pulses of selectable width, position and amplitude can be useful for optimizing multiple disassociation. The shape of the pulse is also selectable and may be selected in accordance with a desired functional form.

The application to chemical ionization experiments of the ability to eliminate high mass ions from the ion trap by using a low frequency supplemental field is shown in FIGS. 8A–C. FIGS. 8A–C show the same CI experiments of FIGS. 4B, 4D and 4G, respectively. However, rather than using broadband resonance ejection to eliminate unwanted sample ions from the trap, a low frequency supplemental waveform was used. It can be seen that the results are substantially the same by either method. The FIG. 8A results were obtained using a supplemental field having a frequency of 600 Hz; the FIG. 8B results were obtained using a supplemental field having frequency of 300 Hz; and the FIG. 8C results were obtained using a supplemental field having frequency of 400 Hz. In each case the magnitude of the supplemental voltage was between 20 and 40 v.

While the present invention has been described in connection with the preferred embodiments thereof, such description is not intended to be limiting and other variations and equivalents will be readily apparent to those skilled in the art. Accordingly, the scope of the invention should be determined solely by reference to the following claims. For example, while the invention has been described, in part, in connection with the performance of chemical ionization experiments preceded by an electron impact ionization step, the method could also be performed using photoionization in lieu of electron impact ionization.

What is claimed is:

1. A method of using an ion trap mass spectrometer in the chemical ionization mode, comprising the steps of:
   - adjusting the trapping field parameters of an ion trap mass spectrometer so that ions having mass-to-charge ratios within a desired range will be stably trapped within the ion trap;
   - introducing a sample into the ion trap mass spectrometer;
   - introducing a reagent gas into the ion trap mass spectrometer;
   - ionizing the sample and reagent gas within the ion trap so that sample and reagent ions having mass-to-charge ratios within said desired range are formed within the ion trap; and
   - applying a supplemental AC field to the ion trap to cause sample ions formed during said ionization step to be ejected from the ion trap,
   - reacting said reagent ions and said Sample without changing said trapping field parameters determined by said step of adjusting.

2. The method of claim 1 wherein said ionization step comprises subjecting the contents of the ion trap to an electron beam, such that sample and reagent ions are formed by electron impact ionization.

3. The method of claim 1 wherein said ionization step comprises subjecting the contents of the ion trap to light, such that sample and reagent ions are formed by photoionization.

4. The method of claim 1 wherein said supplemental AC field is applied to the ion trap during said ionization step.

5. The method of claim 1 wherein said supplemental AC field is applied to the ion trap for a period of time after said ionization step is completed.

6. The method of claim 1 wherein said supplemental AC field is applied to the ion trap commencing no later than the time that said ionization step begins and continuing for a period of time after the ionization step has been completed.

7. The method of claim 1 wherein said supplemental AC field is a quadrupole field.

8. The method of claim 1 wherein said supplemental AC field is approximately a dipole field.

9. The method of claim 1 wherein said supplemental AC field is a monopole field.

10. The method of claim 1 wherein said supplemental AC field is applied to the end cap electrodes of the ion trap.

11. The method of claim 1 wherein said supplemental AC field is applied to the ring electrode of the ion trap.

12. The method of claim 1 wherein said supplemental AC field is a broadband excitation to cause said sample ions to be resonantly ejected from the ion trap, and wherein the highest frequency component contained in said broadband supplemental AC field is less than the frequency necessary to cause the reagent ions to leave the ion trap, such that said broadband supplemental AC field causes only sample ions to be resonantly ejected from the ion trap.

13. The method of claim 12 wherein said supplemental AC field has a highest frequency corresponding to the lowest mass-to-charge ratio sample ion to be ejected from the trap and a lowest frequency corresponding to the highest mass-to-charge ratio sample ion to be ejected from the trap.

14. The method of claim 12 wherein said supplemental AC field comprises a series of discrete frequency components between said highest and lowest frequencies such that substantially all sample ions within the trap are ejected by said supplemental AC field.

15. The method of claim 14 wherein said discrete frequency components are spaced evenly apart.

16. The method of claim 14 wherein said discrete frequency components are spaced unevenly apart.

17. The method of claim 14 wherein said discrete frequency components are have random phases.

18. The method of claim 14 wherein said discrete frequency components have phases with a fixed functional relationship.

19. The method of claim 14 wherein said discrete frequency components have uniform amplitude.

20. The method of claim 14 wherein said discrete frequency components have amplitudes tailored to a selected functional form.

21. The method of claim 1 wherein said step of reacting further comprises the step of allowing said sample to react with said reagent ions for a selected reaction period after sample ions formed during said ionization step have been removed from the trap, whereby sample ions are formed subsequently by chemical ionization.

22. The method of claim 21 wherein said trapping field is held constant during said ionization and said reaction steps.

23. The method of claim 21 further comprising the step of scanning the ion trap after said sample ions have been formed by chemical ionization so that sample ions of sequential mass-to-charge ratios are ejected from the trap and detected in order.

24. The method of claim 23 further comprising repeating the steps of claim 21 after adjusting the reaction period based on the magnitude of the largest peak detected during said scanning step.

25. The method of claim 23 further comprising repeating the steps of claim 21 after adjusting the ionization time based on the magnitude of the largest peak detected during said scanning step.

26. The method of claim 23 further comprising repeating the steps of claim 21 after adjusting both the period of the ionization step and the reaction period based on the magnitude of the largest peak detected during said scanning step.

27. The method of claim 23 wherein said reaction period is adjusted so that the total amount of charge within the ion trap remains substantially constant from one scan to another.

28. The method of claim 1 wherein said supplemental AC field is a low frequency dipole field such that sample ions are eliminated from the trap by non-resonant ejection.

29. The method of claim 28 wherein said low frequency supplemental field has a frequency in the range of 100–10,000 Hz.

30. The method of claim 28 wherein said supplemental AC field has the waveform of a squarewave.

31. A method of using an ion trap mass spectrometer in the electron impact ionization mode while continuously delivering a supply of reagent gas to the ion trap, comprising the steps of:

adjusting the trapping field parameters of an ion trap mass spectrometer so that ions having mass-to-charge ratios within a desired range will be stably trapped within the ion trap;

introducing a sample into the ion trap mass spectrometer having a flow of reagent gas thereto;

subjecting the sample and reagent gas within the ion trap to an electron beam so that sample and reagent ions having mass-to-charge ratios within said desired range are formed by electron impact ionization within the trap;

applying a broadband supplemental AC field to the ion trap to cause reagent ions formed during said electron impact ionization to be resonantly ejected from the ion trap, such that said broadband supplemental AC field causes only sample ions to remain in the ion trap; and scanning said ion trap so that sample ions of sequential mass-to-charge ratios are ejected from the trap and detected whereby an electron impact ionization mass spectrum is acquired in the presence of reagent gas for alternative measurements.

32. A method of adjusting the dynamic range of an ion trap mass spectrometer used in the chemical ionization multiple scan mode, comprising the steps of:

(a) applying a trapping field to said ion trap such that ions within a range of desired mass-to-charge ratios will be stably trapped, (b) introducing sample and reagent gas into the ion trap, (c) ionizing said sample and reagent gas for an ionization period, (d) removing sample ions formed during said ionization period from said trap, (e) allowing sample molecules to react with said reagent ions for a chemical ionization period to form sample ions, (f) scanning said trap to cause sample ions of sequential mass-to-charge ratios to leave the trap in order, (g) detecting the sample ions as they leave the trap, (h) identifying the sample ion that was present in the greatest concentration and determining the concentration of said sample ion, (i) repeating steps (a) through (g) using said concentration information to adjust either the ionization period or the chemical ionization period or both.

33. A method of fragmenting a parent ion in an ion trap mass spectrometer, comprising the steps of:

forming and trapping a parent ion in the ion trap;

applying a low frequency supplemental AC dipole field to the ion trap, said low frequency field having a frequency that is lower than the resonant frequency of the parent ion, such that said parent ion undergoes collision induced dissociation with a background gas; and obtaining a mass spectrum of the contents of the ion trap.

34. The method of claim 33 wherein said low frequency supplemental AC dipole field has a frequency in the range of 100–10,000 Hz.

35. The method of claim 33 wherein said low frequency supplemental AC dipole field imposed on the trap for a period of time which is long enough to form multiple generations of ion fragments from said parent ion.

36. The method of claim 35 further comprising the step of using the mass spectrum of the contents of the ion trap to unambiguously identify the parent ion.

37. A method of scanning an ion trap mass spectrometer to obtain a mass spectrum of the contents of the ion trap, comprising:

adjusting the trapping field parameters of an ion trap mass spectrometer so that ions having mass-to-charge ratios within a desired range will be stably trapped within the ion trap;

introducing sample ions into the ion trap;

applying a low frequency supplemental AC dipole field to the ion trap said low frequency lower than the resonant frequency of said desired ions;

scanning at least one of either the trapping field parameters or the magnitude of the low frequency supplemental AC dipole field, such that ions of consecutive mass-to-charge ratio are non-resonantly ejected from the trap in order; and detecting the ions ejected from the trap.

38. The method of claim 37 wherein said scanning step comprises increasing the magnitude of the supplemental low frequency AC dipole field.

39. The method of claim 37 wherein said supplemental low frequency AC dipole field has a frequency in the range of 100–10,000 Hz.

40. A method for fragmenting a parent ion in an ion trap mass spectrometer, comprising the steps of: , (a) forming and trapping a parent ion in the ion trap, (b) applying at least one supplemental transient field to the ion trap, said transient field is a unipolar lobed waveform having selected amplitude and duration, such that said parent ion undergoes collision induced disassociation with a background gas, and (c) obtaining a mass spectrum of a contents of the ion trap.

41. The method of claim 40 wherein said supplemental transient field has amplitude in the range of 5–100 volts.

42. The method of claim 40 wherein said supplemental transient field is applied to the trap for a period of time sufficient to form multiple generations of ion fragments from said parent ion.

43. The method of claim 40 wherein said supplemental transient field comprises a plurality of transient fields applied in succession.

44. The method of claim 43 wherein said plurality of transient fields is applied with selected periodicity.

45. The method of claim 43 wherein said plurality of transient field is applied a periodically.

46. The method of claim 43 wherein each said transient field of said plurality comprise selected amplitude and duration.

47. A method of using an ion trap mass spectrometer in the electron impact ionization mode while continuously delivering a supply of reagent gas to the ion trap, comprising the steps of:

(a) adjusting the trapping field parameters of an ion trap mass spectrometer so that ions having mass-to-charge ratios within a desired range will be stably trapped within the ion trap;

(b) introducing a sample into the ion trap mass spectrometer having a flow of reagent gas thereto;

(c) subjecting the sample and reagent gas within the ion trap to an electron beam so that sample and reagent ions having mass-to-charge ratios within said desired range are formed by electron impact ionization within the trap;

(d) applying a first broadband supplemental AC field to the ion trap to cause reagent ions formed during said electron impact ionization to be resonantly ejected from the ion trap, such that said first broadband supplemental AC field causes only sample ions to remain in the ion trap; and (e) scanning said ion trap so that sample ions of sequential mass-to-charge ratios are ejected from the trap and an electron ionization mass spectrum is obtained therefrom and recorded;

(f) repeating steps (a) through (c) inclusive;

(g) applying a second broadband supplemental AC field to the ion trap to cause sample ions formed during said ionization step to be ejected from the trap;

(h) continuing to introduce sample to said trap whereby said sample now reacts with said reagent ions formed during said ionization step for a period of time and sample ions are formed by chemical ionization;

(i) again scanning the ion trap to acquire a chemical ionization mass spectrum of said sample.

* * * * *